(12) United States Patent
Goosens

(10) Patent No.: US 7,021,779 B1
(45) Date of Patent: Apr. 4, 2006

(54) REARVIEW MIRROR HAVING BOTH A STATIONARY MIRROR AND A PIVOTING MIRROR

(76) Inventor: Donald David Goosens, 50 Pueblo Rd., Montgomery, IL (US) 60538

( * ) Notice: Subject to any disclaimer, the term of this patent is extended or adjusted under 35 U.S.C. 154(b) by 0 days.

(21) Appl. No.: 10/937,697

(22) Filed: Sep. 9, 2004

Related U.S. Application Data

(60) Provisional application No. 60/503,169, filed on Sep. 15, 2003.

(51) Int. Cl.
*G02B 7/182* (2006.01)
(52) U.S. Cl. ........................... 359/862; 359/875
(58) Field of Classification Search ............... 359/854, 359/855, 865, 866, 871, 872, 875, 879
See application file for complete search history.

(56) References Cited

U.S. PATENT DOCUMENTS 3,145,257 A * 8/1964 Suga ........................ 359/854
4,643,544 A * 2/1987 Loughran ................... 359/854
4,695,138 A * 9/1987 Epstein ...................... 359/854
5,153,781 A * 10/1992 Brandt ....................... 359/865

* cited by examiner

*Primary Examiner*—Euncha P. Cherry
(74) *Attorney, Agent, or Firm*—Goldstein Law Offices, P.C.

(57) ABSTRACT

A rearview mirror having both a stationary mirror and a pivoting mirror assembly having a pivoting mirror. The stationary mirror and the pivoting mirror are mounted in proximity to one another within a mirror housing. The stationary mirror is fixed in its position within the mirror housing and is used for selectively viewing the road behind the vehicle. The pivoting mirror may be selectively swiveled by the driver, by sliding a lever in mechanical contact with the pivoting mirror assembly, thereby causing the pivoting mirror to form an angle with respect to the stationary mirror. The pivoting mirror is used for selectively viewing a passenger seated in the front passenger seat of the vehicle. The pivoting mirror is a safety feature which enables the driver to look at the passenger without having to divert his/her eyes away from the road in front of the vehicle or from the stationary mirror which provides a view of the road behind the vehicle.

2 Claims, 3 Drawing Sheets

REARVIEW MIRROR HAVING BOTH A STATIONARY MIRROR AND A PIVOTING MIRROR

CROSS REFERENCES AND RELATED SUBJECT MATTER

This application is a continuation of provisional patent application Ser. No. 60/503,169, filed in the United States Patent Office on Sep. 15, 2003.

BACKGROUND OF THE INVENTION

1. Field of the Invention

The invention generally relates to a rearview mirror, and in particular relates to a rearview mirror having both a stationary mirror and a pivoting mirror.

2. Description of the Related Art

While driving a vehicle, a driver must keep his/her attention focused upon the road ahead as well as behind the vehicle. A standard rearview mirror enhances driving safety by enabling the driver to momentarily view behind the vehicle without substantially turning his/her head away from the road. Often, however, the driver will engage in conversation with a passenger seated in the front passenger seat of the vehicle, and will turn his/her head to look at the passenger while driving. This will distract the driver from paying attention to the road ahead of or behind the vehicle, thereby increasing the chances of occurrence of a car accident. Accordingly, there is a need for a rearview mirror having both a stationary mirror for viewing the road behind the vehicle, and a pivoting mirror which selectively swivels with respect to the mirror housing, thereby enabling the driver to selectively view the passenger without having to turn his/her head away from the road in front of the vehicle or from the stationary mirror which provides a view of the road behind the vehicle.

A variety of rearview mirrors have been devised for use within a vehicle. For example, U.S. Pat. No. 6,039,455 to Sorenson and U.S. Pat. No. 5,668,526 to Collins both appear to show a rearview mirror comprised of a main portion and an auxiliary portion that is used to view an occupant in a rear seat. Furthermore, U.S. Pat. No. 5,237,459 and U.S. Pat. No. 5,237,459, both to Straus, appear to show a rearview mirror comprised of a pair of mirrors.

While these devices may be suitable for the particular purpose employed, or for general use, they would not be as suitable for the purposes of the present invention as disclosed hereafter.

SUMMARY OF THE INVENTION

It is an object of the invention to provide a rearview mirror which allows a driver to view the road behind the vehicle without having to turn his/her head away from the road in front of the vehicle. Accordingly, the rearview mirror has a stationary mirror rigidly mounted within a mirror housing. The stationary mirror enables the driver to view the road behind the vehicle without having to turn his/her head away from the road in front of the vehicle.

It is another object of the invention to provide a rearview mirror which enables the driver to observe a passenger seated within the passenger seat of the vehicle without having to turn his/her head away from the road in front of the vehicle or from the stationary mirror which provides a view of the road behind the vehicle. Accordingly, the rearview mirror has a pivoting mirror assembly having a pivoting mirror. The driver selectively swivels the pivoting mirror by sliding a lever in mechanical contact with the pivoting mirror, thereby enabling the driver to observe the passenger without having to turn his/her head away from the road in front of the vehicle or from the stationary mirror which provides a view of the road behind the vehicle.

It is yet another object of the invention to provide a rearview mirror which is easily attached to the interior of an existing vehicle. Accordingly, the rearview mirror is provided with an attachment rod which may be selectively attached to the same base which was used for attaching the existing rearview mirror of the vehicle to the interior of the vehicle, thereby providing a rearview mirror which is easily attached to the interior of an existing vehicle.

It is an additional object of the invention to provide a rearview mirror which is not unduly expensive. Accordingly, the rearview mirror is constructed from readily available materials, and its cost is not prohibitive.

Further objects of the invention will become apparent in the detailed description of the invention which follows.

The invention is a rearview mirror having both a stationary mirror and a pivoting mirror assembly having a pivoting mirror. The stationary mirror and the pivoting mirror are mounted in proximity to one another within a mirror housing. The stationary mirror is fixed in its position within the mirror housing and is used for selectively viewing the road behind the vehicle. The pivoting mirror may be selectively swiveled by the driver, by sliding a lever in mechanical contact with the pivoting mirror assembly, thereby causing the pivoting mirror to form an angle with respect to the stationary mirror. The pivoting mirror is used for selectively viewing a passenger seated in the front passenger seat of the vehicle. The pivoting mirror is a safety feature which enables the driver to look at the passenger without having to divert his/her eyes away from the road in front of the vehicle or from the stationary mirror which provides a view of the road behind the vehicle.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
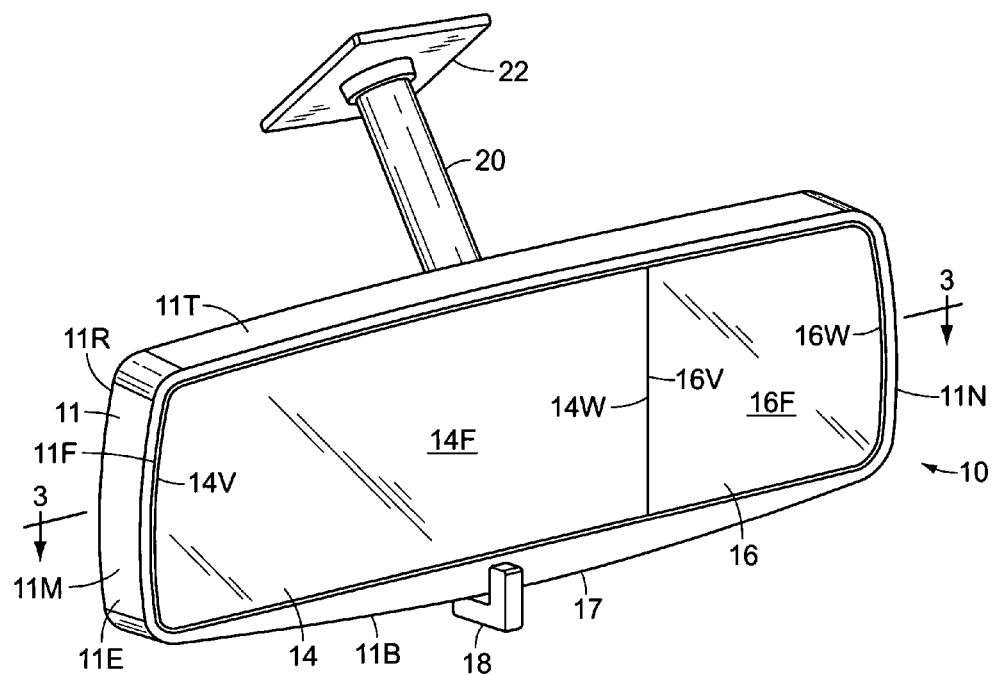
FIG. 1 is a perspective view of a rearview mirror, wherein the front surfaces of a stationary mirror and a pivoting mirror are parallel to one another.
Figure 3:
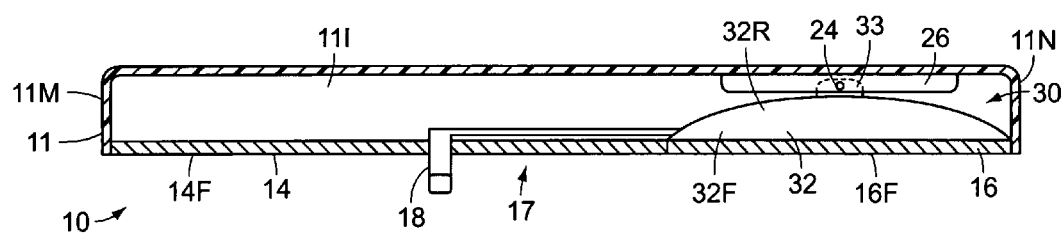
FIG. 3 is a cross-sectional view of the rearview mirror, taken along line 3—3 of FIG. 1, illustrating a pivoting mirror assembly in a retracted position, wherein the front surfaces of the stationary mirror and the pivoting mirror are parallel to one another.
Figure 4:
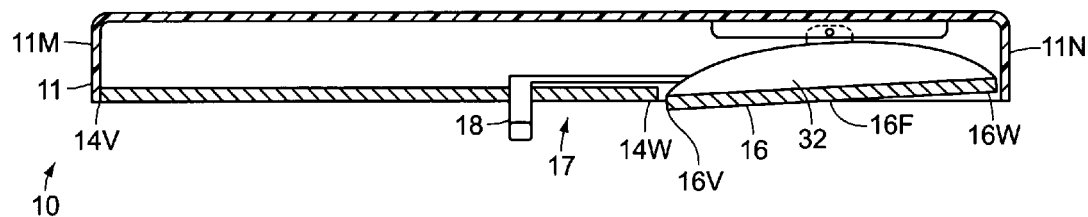
FIG. 4 is a cross-sectional view of the rearview mirror, taken along line 4—4 of FIG. 2, illustrating the pivoting mirror assembly in an extended position, wherein the front surface of the pivoting mirror forms an angle with the front surface of the stationary mirror.

FIG. 1 illustrates a rearview mirror 10, for use in conjunction with a vehicle having an interior, a central portion, a front, and a rear. The rearview mirror 10 comprises a substantially rectangular mirror housing 11 having a front 11F, a rear 11R, a top 11T, a bottom 11B, a first side 11M, an opposing second side 11N, an interior 11I, an exterior 11E, and a substantially rectangular slot 17 having a first end and a second end, extending fully through the bottom 11B of the mirror housing 11 and extending partially from the first side 11M to the second side 11N of the mirror housing 11. The first end of the slot 17 is more proximal to the first side 11M of the housing 11, and the second end of the slot 17 is more proximal to the second side 11N of the housing 11. The interior 11I of the housing 11 is illustrated in FIG. 3 and FIG. 4. Returning to FIG. 1, the rearview mirror 10 additionally comprises a substantially cylindrical attachment rod 20 extending from the rear 11R of the mirror housing 11, and a base 22 attached to the attachment rod 20. The base 22 is used for anchoring the rearview mirror 10 to the interior of the vehicle in proximity to the central portion of the vehicle, above the head of the driver. The attachment rod 20 selectively attaches the mirror housing 11 to the base 22. The housing 11 is capable of swiveling with respect to the base 22, thereby providing a rearview mirror 10 which may be angled to suit the particular preferences of the driver of the vehicle. It is contemplated that the rearview mirror 10 may be used to replace an existing rearview mirror provided with the vehicle. When used to replace the existing rearview mirror, the rearview mirror 10 may be selectively attached to the base of the existing rearview mirror, thereby avoiding the need to detach the existing base from the interior of the vehicle, and reattach the base 22 provided with the rearview mirror 10 to the interior of the vehicle.

The rearview mirror 10 has a substantially rectangular planar stationary mirror 14 having a reflective front surface 14F, a first side 14V, and a second side 14W. The stationary mirror 14 is rigidly mounted within the mirror housing 11 at a position in proximity to the front 11F of the housing 11, and extends from the first side 11M of the housing 11 partially to the second side 11N of the housing 11. The stationary mirror 14 is used in a manner analogous to that of a "standard" rearview mirror provided with a vehicle. In particular, the stationary mirror 14 allows the driver to view the road behind the vehicle without having to turn his/her head away from the road in front of the vehicle.

Turning to FIG. 3, the rearview mirror 10 additionally has a pivoting mirror assembly 30 substantially enclosed within the mirror housing 11, for selectively allowing the driver of the vehicle to view the passenger seated in the front passenger seat of the vehicle without having to divert the eyes of the driver from the road ahead of the vehicle, or from the stationary mirror 14. The pivoting mirror assembly 30 comprises a pivoting mirror anchor 26 rigidly attached to the interior 11I of the housing 11, a mirror support 32, and a pivot 24 for hingeably attaching the mirror support 32 to the pivoting mirror anchor 26.

The mirror support 32 has a front 32F, a rear 32R, and a tab 33 extending from the rear 32R. The tab 33 has a circular opening extending vertically therethrough, for engaging the pivot 24. The pivoting mirror assembly 30 has a planar, substantially rectangular pivoting mirror 16 having a reflective front surface 16F, a first side 16V, and a second side 16W. The pivoting mirror 16 is rigidly mounted within the mirror support 32 at a position in proximity to the front 32F of the mirror support 32. The pivoting mirror 16 is substantially smaller than the stationary mirror 14. The mirror support 32 and its attached pivoting mirror 16 are capable of being selectively swiveled with respect to the mirror housing 11, as will be described.

The pivoting mirror anchor 26 is rigidly attached to the interior 11I of the mirror housing 11 in proximity to the rear 11R of the mirror housing 11. The anchor 26 has a vertical cylindrical channel extending at least partially therethrough for engaging the pivot 24.

The selectively rotatable, substantially cylindrical pivot 24 selectively extends through both the cylindrical channel of the anchor and the circular opening extending through the tab 33 of the mirror support 32, thereby allowing the mirror support 32 to swivel upon the pivot 24 with respect to the pivoting mirror anchor 26, thereby allowing the front surface 16F of the pivoting mirror 16 to be selectively angled with respect to the front surface 14F of the stationary mirror 14.

The pivoting mirror assembly 30 has a retracted position wherein the front surface 16F of the pivoting mirror 16 is parallel to and substantially coextensive with the front surface 14F of the stationary mirror 14, a plurality of partially extended positions wherein the front surface 16F of the pivoting mirror 16 is angled to various extents with respect to the front surface 14F of the stationary mirror 14, and a fully extended position wherein the front surface 16F of the pivoting mirror 16 is maximally angled with respect to the front surface 14F of the stationary mirror 14. FIG. 1 and FIG. 3 illustrate the pivoting mirror assembly 30 in the fully retracted position, wherein the front surface 16F of the pivoting mirror 16 is parallel to the front surface 14F of the stationary mirror 14, and wherein the second side 14W of the stationary mirror 14 and the first side 16V of the pivoting mirror 16 substantially abut one another.

The pivoting mirror assembly 30 has a lever 18 extending from the interior 11I of the housing 11 to the exterior 11E of the housing 11 through the slot 17 extending through the bottom 11B of the housing 11. The lever 18 is in mechanical contact with the mirror support 32. The lever 18 is used by the driver for selectively converting the pivoting mirror assembly 30 from the retracted position to one of the plurality of available extended positions. The driver converts the pivoting mirror assembly 30 to one of the available extended positions by sliding the lever 18 within the slot 17 from the first side 11M to the second side 11N of the mirror housing 11, thereby causing the mirror support 32 in mechanical contact with the lever 18 to swivel with respect to the pivoting mirror anchor 26, upon the pivot 24. To maximize the angle that the pivoting mirror 16 selectively forms with respect to the stationary mirror 14, the driver slides the lever 18 fully toward the end of the slot 17 which is more proximal to the second side 11N of the housing 11.

Figure 2:
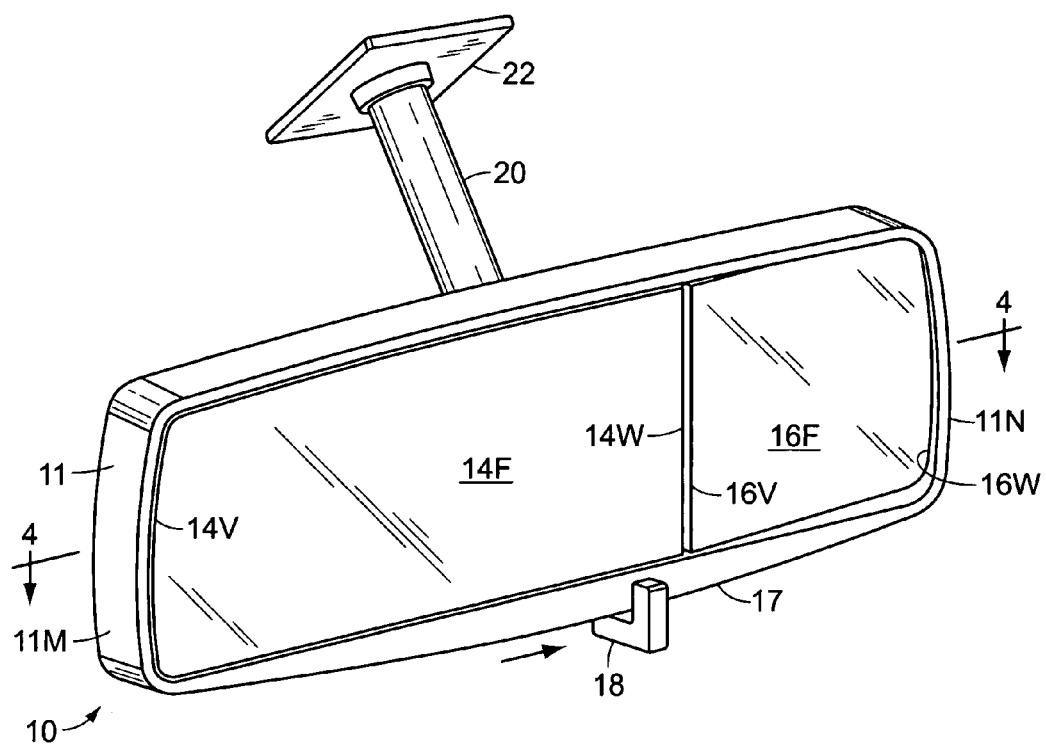
FIG. 2 is a perspective view of the rearview mirror, as in FIG. 1, except that a lever has been selectively moved towards a second side of a housing, thereby causing the pivoting mirror to partially swivel upon a pivot.

FIG. 2 and FIG. 4 each illustrate a view of the rearview mirror 10, wherein the pivoting mirror assembly 30 is in one of the plurality of available extended positions, wherein the pivoting mirror 16 forms an angle with respect to the stationary mirror 14, thereby providing the driver of the vehicle with a view of the passenger seated in the front passenger seat.

FIG. 1 illustrates a view of the rearview mirror 10, wherein the lever 18 has been slid by the driver within the slot 17 to a position which is more proximal to the first side 11M of the housing 11, thereby causing the pivoting mirror assembly 30 to be in its fully retracted position. Here, the front surface 14F of the stationary mirror 14 and the front surface 16F of the pivoting mirror 16 are parallel with one another.

FIG. 2 illustrates a view of the rearview mirror 10, wherein the lever 18 has been slid by the driver within the slot 17 to a position which is more proximal to the second side 11M of the housing 11, thereby causing the pivoting mirror assembly 30 to be in one of its plurality of partially extended positions. Here, the front surface 16F of the pivoting mirror 16 forms an angle with respect to the front surface 14F of the stationary mirror 14.

The rearview mirror 10 is provided in a variety of sizes, in order that it may be suitably used with vehicles having different sizes. The stationary mirror 14 and the pivoting mirror 16 are preferably constructed from mirrored glass, and the housing 11 is preferably substantially constructed from plastic.

In use, the driver attaches the rearview mirror 10 to the interior of the vehicle at a location in proximity to the central portion of the vehicle. In particular, the rearview mirror 10 may be attached by its base 22 to the interior of the vehicle, or alternately the attachment rod 20 of the rearview mirror 10 may be attached to the same base that was used for selectively attaching the preexisting rearview mirror to the interior of the vehicle. The driver adjusts the position of the stationary mirror 14 by swiveling the mirror housing 11 on the attachment rod 20. The driver adjusts the angle of the pivoting mirror 16 by selectively sliding the lever 18 within the slot 17 between the first side 11M and the second side 11N of the housing 11. To covert the pivoting mirror assembly 30 to the fully retracted position, the driver slides the lever 18 fully towards the end of the slot 17 which is more proximal to the first side 11M of the housing 11. To convert the pivoting mirror assembly 30 to one of the plurality of partially extended positions, the driver slides the lever 18 partially towards the end of the slot 17 which is more proximal to the second side 11N of the housing 11. To convert the pivoting mirror assembly 30 to the fully extended position, the driver slides the lever 18 fully towards the end of the slot 17 which is more proximal to the second side 11N of the housing 11, thereby maximizing the angle that the pivoting mirror 16 forms with the stationary mirror 14.

In conclusion, herein is presented a rearview mirror for a vehicle, having both a stationary mirror for allowing the driver to view the road behind the vehicle, and a pivoting mirror for allowing the driver to selectively view the passenger seated within the front passenger seat of the vehicle. The invention is illustrated by example in the drawing figures, and throughout the written description. It should be understood that numerous variations are possible, while adhering to the inventive concept. Such variations are contemplated as being a part of the present invention.

What is claimed is:

1. A rearview mirror, for use by a driver of an existing motor vehicle while driving on a road, said vehicle having a front passenger seat for seating a passenger, and an interior, said rearview mirror for allowing the driver to view the road behind the vehicle, and to selectively view the passenger seated within the front passenger seat, comprising:

a mirror housing having a bottom, a first side, an opposing second side, an interior, and an exterior, the bottom of the mirror housing has a slot having a first end more proximal to the first side of the housing, and having a second end more proximal to the second side of the housing;

an attachment rod extending from the mirror housing, having an attached base for anchoring the rearview mirror to the interior of the vehicle, wherein the housing is capable of swiveling with respect to the base, thereby providing a rearview mirror which is selectively angled;

a planar stationary mirror mounted within the mirror housing, having a reflective front surface, a first side, and a second side, said stationary mirror extending from the first side of the housing partially to the second side of the housing, wherein the stationary mirror is used by the driver for viewing the road behind the vehicle without having to turn his/her head away from the road in front of the vehicle;

a pivoting mirror assembly within the mirror housing, for selectively allowing the driver to view the passenger seated in the front passenger seat without having to turn his/her head away from the road in front of the vehicle, or away from the stationary mirror, said pivoting mirror assembly having a pivoting mirror anchor rigidly attached to the interior of the housing, a mirror support pivotally attached to the pivoting mirror anchor, and a pivoting mirror rigidly mounted within the mirror support, said pivoting mirror having a reflective front surface;

a retracted position wherein the front surface of the pivoting mirror is parallel to and substantially coextensive with the front surface of the stationary mirror;

a plurality of extended positions wherein the front surface of the pivoting mirror has been angled to various extents with respect to the front surface of the stationary mirror by pivoting the mirror support with respect to the pivoting mirror anchor, thereby providing the driver of the vehicle with a view of the passenger seated in the front passenger seat; and a lever extending through the slot and in mechanical contact with the mirror support, said lever for selectively converting the rearview mirror from the retracted position to one of the plurality of available extended positions by sliding the lever within the slot from the first side to the second side of the mirror housing, thereby causing the mirror support in mechanical contact with the lever to pivot with respect to the pivoting mirror anchor.

2. A method for enabling a driver of an existing motor vehicle to view a road behind the vehicle, and also to selectively view a passenger seated within an existing front passenger seat of the vehicle, said method utilizing a rearview mirror having a mirror housing having a bottom, a first side, and an opposing second side, said rearview mirror having an attachment rod extending from the mirror housing, said attachment rod having an attached base, said rearview mirror having a planar stationary mirror and having a pivoting mirror assembly having a pivoting mirror, wherein the bottom of the mirror housing has a slot having a first end more proximal to the first side of the housing, and a second end more proximal to the second side of the housing, wherein the rearview mirror has a lever extending through the slot, said lever in mechanical contact with the pivoting mirror, said method comprising the steps of:

attaching the rearview mirror to the vehicle by anchoring the base of the attachment rod to the vehicle;

adjusting the position of the stationary mirror by swiveling the mirror housing on the attachment rod;

viewing the road behind the vehicle with the stationary mirror;

pivoting the pivoting mirror with respect to the stationary mirror by sliding the lever towards the end of the slot which is more proximal to the second side of the housing; and viewing the passenger seated in the front passenger seat with the pivoting mirror.

* * * * *